(12) United States Patent
Abe et al.

(10) Patent No.: US 10,890,443 B2
(45) Date of Patent: Jan. 12, 2021

(54) ROUNDNESS MEASURING DEVICE, MEASUREMENT GUIDE SYSTEM, AND MEASUREMENT GUIDE METHOD

(71) Applicant: Mitutoyo Corporation, Kanagawa (JP)

(72) Inventors: Shinsaku Abe, Hokkaido (JP); Hideyuki Kusanagi, Hokkaido (JP)

(73) Assignee: MITUTOYO CORPORATION, Kawasaki (JP)

( * ) Notice: Subject to any disclaimer, the term of this patent is extended or adjusted under 35 U.S.C. 154(b) by 21 days.

(21) Appl. No.: 16/438,912

(22) Filed: Jun. 12, 2019

(65) Prior Publication Data

US 2020/0041265 A1     Feb. 6, 2020

(30) Foreign Application Priority Data

Aug. 1, 2018  (JP) ................. 2018-144781

(51) Int. Cl.
*G01B 11/27* (2006.01)
*G06T 7/70* (2017.01)
*G06K 9/00* (2006.01)

(52) U.S. Cl.
CPC ........ *G01B 11/272* (2013.01); *G06K 9/00671* (2013.01); *G06T 7/70* (2017.01); *G06T 2207/10016* (2013.01)

(58) Field of Classification Search
None
See application file for complete search history.

(56) References Cited

U.S. PATENT DOCUMENTS

| 2008/0294369 A1* | 11/2008 | Kojima ............... | G01B 5/201 |
| | | | 702/168 |
| 2009/0048799 A1* | 2/2009 | Kadowaki ............ | G01B 5/252 |
| | | | 702/95 |

(Continued)

FOREIGN PATENT DOCUMENTS

| JP | 2001-201340 | 7/2001 |
| JP | 2001-201341 | 7/2001 |
| JP | 2018-036130 | 3/2018 |

OTHER PUBLICATIONS

Horikawa et al., "A low cost, high accuracy roundness measuring system" (Year: 2001).*

(Continued)

*Primary Examiner* — Hilina K Demeter
(74) *Attorney, Agent, or Firm* — Rankin, Hill & Clark LLP (57) ABSTRACT

A rotary table including a placement surface with an object; a rotary base rotating the rotary table; a detector detecting displacement of a peripheral surface of the object; an angle adjustment mechanism adjusting an inclination angle of the rotary table; a position adjustment mechanism adjusting a position of the rotary table; a video acquisition unit acquiring a video of the rotary base; a display unit displaying an image based on the video; a position recognition unit recognizing images of the rotary table, rotary base, and object on the display unit and recognizing positions of the rotary table, rotary base, and object in a display space of the images; and a display control unit performing control of displaying a guide in a superimposing manner on the image on the display unit on a basis of the positions of the rotary table, rotary base, and object recognized by the position recognition unit.

11 Claims, 9 Drawing Sheets

(56) References Cited

U.S. PATENT DOCUMENTS

| | | | |
|---|---|---|---|
| 2013/0222580 A1* | 8/2013 | Kurahashi | B23Q 17/2409 |
| | | | 348/135 |
| 2016/0265912 A1* | 9/2016 | Yasuno | G01B 3/30 |
| 2016/0320764 A1* | 11/2016 | Ogawa | G05B 19/19 |
| 2018/0149457 A1* | 5/2018 | Masuta | G01B 3/22 |
| 2018/0182595 A1* | 6/2018 | Yokosuka | G03F 7/70625 |

OTHER PUBLICATIONS

Mekid et al. "In-process out-of-roundness measurement probe for turned workpieces" (Year: 2011).*

He et al., "Measure dimension of rotating large hot steel shell using pulse laser on PRRR robot" (Year: 2012).*

* cited by examiner

ROUNDNESS MEASURING DEVICE, MEASUREMENT GUIDE SYSTEM, AND MEASUREMENT GUIDE METHOD

TECHNICAL FIELD

The present invention relates to a roundness measuring device, a measurement guide system, and a measurement guide method of measuring roundness and a cylindrical shape of an object.

Background Art

A roundness measuring device configured to measure roundness along a peripheral surface of an object includes a rotary table configured to rotate the object; and a detection unit configured to detect the position of the peripheral surface of the object being rotated. Before measurement is performed in the roundness measuring device, it is necessary to perform centering for matching a rotation axis of the rotary table with a center axis of the object and perform leveling for matching horizontal positions of both axes.

Patent Documents 1, 2 and 3 disclose centering and leveling in a roundness measuring device. In order to perform centering and leveling in a roundness measuring device, first, an object is rotated in a state where a stylus of a detection unit is in contact with a peripheral surface of the object placed on a rotary table, and the center of the object is determined based on the detected position of the peripheral surface. Then, a deviation amount between the center and a rotation axis of the rotary table is calculated, and the rotary table is translated and tilted by using a centripetal axle incorporated in the rotary table to perform the centering and the leveling.

CITATION LIST

Patent Literature

Patent Document 1: JP 2018-036130 A
Patent Document 2: JP 2001-201340 A
Patent Document 3: JP 2001-201341 A

SUMMARY OF INVENTION

Technical Problem

In such a roundness measuring device, preliminary measurement is necessary to perform the centering and the leveling. Specifically, an object is placed in the vicinity of the center of a rotary table, the rotary table is rotated, and the position of the center axis is temporarily measured by measuring the peripheral surface of the object. After a horizontal position and inclination of the rotary table are adjusted to eliminate deviation between the center axis and the rotation axis obtained by this measurement, the peripheral surface of the object is again measured, and the center axis is determined to adjust axial deviation. This operation is repeated, and thus the deviation between the rotation axis of the rotary table and the center axis of the object falls within an acceptable range.

A mechanism for automatically performing the centering and the leveling described above has also been studied. However, in the centering and the leveling, when the position of the object placed first on the rotary table is excessively deviated, a large amount of time becomes necessary for preliminary measurement and automatic adjustment. In addition, the adjustment range of the rotary table is approximately ±5 mm in the horizontal direction and approximately ±1 degree in the angle, and when the deviation amount is large, alignment may not be achieved within the adjustment range of the rotary table.

An object of the invention is to provide a roundness measuring device, a measurement guide system, and a measurement guide method enabling an object to be easily and accurately aligned with a rotation axis when the object is placed on a rotary table.

Solution to Problem

An aspect of the invention is a roundness measuring device configured to measure a position of a peripheral surface of an object, the roundness measuring device including: a rotary table including a placement surface on which the object is placed; a rotary base configured to rotate the rotary table about a rotation axis; a detector configured to detect displacement of the peripheral surface of the object being rotated; an angle adjustment mechanism configured to adjust an inclination angle of the rotary table with respect to the rotation axis; a position adjustment mechanism configured to adjust a position of the rotary table along a plane orthogonal to the rotation axis; a video acquisition unit configured to acquire a video of the rotary base and a region around the rotary base; a display unit configured to display an image based on the video; a position recognition unit configured to recognize images of the rotary table, the rotary base, and the object displayed on the display unit and configured to recognize positions of the rotary table, the rotary base, and the object in a display space of the images; and a display control unit configured to perform control of displaying a guide in a superimposing manner on the image displayed on the display unit on a basis of the positions of the rotary table, the rotary base, and the object recognized by the position recognition unit.

According to such a configuration, when measurement is performed in the roundness measuring device, a video of the rotary table, the rotary base, and the object is acquired by the video acquisition unit, and an image based on the video is displayed on the display unit. At this time, the positions of the rotary table, the rotary base, and the object displayed on the display unit are recognized, and the guide can be displayed in the superimposing manner on the display unit on the basis of the positions.

In the above-described roundness measuring device, the position recognition unit may recognize a position of the rotation axis on a basis of the image of the rotary base; and the display control unit may perform control of displaying a rotation axis image indicating the rotation axis in a superimposing manner on the image of the rotary table displayed on the display unit on a basis of the position of the rotation axis recognized by the position recognition unit. Thus, the rotation axis image is displayed in the superimposing manner on the image of the rotary table displayed on the display unit, and the position of the rotation axis not actually visible can be determined with the image.

In the above-described roundness measuring device, the position recognition unit may recognize a position of a center axis of the object on a basis of the image of the object; and the display control unit may perform control of displaying a center axis image indicating the center axis in a superimposing manner on the image of the object displayed on the display unit on a basis of the position of the center axis recognized by the position recognition unit. Thus, the center axis image is displayed in the superimposing manner on the image of the object displayed on the display unit, and the position of the center axis not actually visible can be determined.

In the above-described roundness measuring device, the display control unit may perform control of displaying on the display unit a deviation angle of the center axis with respect to the rotation axis. Thus, the deviation angle of the center axis with respect to the rotation axis can be determined with reference to the display unit.

In the above-described roundness measuring device, when the deviation angle falls within a preset range, the display control unit may perform control of displaying on the display unit a state indicating that the deviation angle is within the preset range. Thus, when the object is placed on the rotary table, it is possible to determine with the state display of the display unit that the deviation angle of the center axis with respect to the rotation axis falls within a predetermined range.

In the above-described roundness measuring device, the display control unit may perform control of displaying on the display unit a positional deviation amount of the center axis with respect to the rotation axis along the plane. Thus, the positional deviation amount of the center axis with respect to the rotation axis can be determined with reference to the display unit.

In the above-described roundness measuring device, when the positional deviation amount falls within a preset range, the display control unit may perform control of displaying on the display unit a state indicating that the positional deviation amount is within the preset range. Thus, when the object is placed on the rotary table, it is possible to determine with the state display of the display unit that the positional deviation amount of the center axis with respect to the rotation axis is within a predetermined range.

In the above-described roundness measuring device, the display control unit may perform control of sending to the angle adjustment mechanism the deviation angle obtained when the object is placed on the placement surface; and the angle adjustment mechanism may adjust the inclination angle of the rotary table to cancel out the deviation angle sent from the display control unit. Thus, after the object is placed on the rotary table in accordance with the guide displayed on the display unit, the deviation angle of the center axis with respect to the rotation axis can be modified automatically.

In the above-described roundness measuring device, the display control unit may perform control of sending to the position adjustment mechanism the positional deviation amount obtained when the object is placed on the placement surface; and the position adjustment mechanism may adjust the position of the rotary table along the plane to cancel out the positional deviation amount sent from the display control unit. Thus, after the object is placed on the rotary table in accordance with the guide displayed on the display unit, the positional deviation of the center axis with respect to the rotation axis along the plane can be modified automatically.

An aspect of the invention is a measurement guide system configured to guide measurement in a roundness measuring device including a rotary table including a placement surface on which an object is placed, a rotary base configured to rotate the rotary table about a rotation axis, and a detector configured to detect displacement of a peripheral surface of the object being rotated, the measurement guide system including: a video acquisition unit configured to acquire a video of the rotary base and a region around the rotary base; a display unit configured to display an image based on the video; a position recognition unit configured to recognize images of the rotary table, the rotary base, and the object displayed on the display unit and configured to recognize positions of the rotary table, the rotary base, and the object in a display space of the images; and a display control unit configured to perform control of displaying a guide in a superimposing manner on the image displayed on the display unit on a basis of the positions of the rotary table, the rotary base, and the object recognized by the position recognition unit.

According to such a configuration, when measurement is performed in the roundness measuring device, a video of the rotary table, the rotary base, and the object is acquired by the video acquisition unit, and an image based on the video is displayed on the display unit. At this time, positions of the rotary table, the rotary base, and the object displayed on the display unit are recognized, and the guide can be displayed in the superimposing manner on the display unit on the basis of the positions.

An aspect of the invention is a measurement guide method for guiding measurement in a roundness measuring device including a rotary table including a placement surface on which an object is placed, a rotary base configured to rotate the rotary table about a rotation axis, and a detector configured to detect displacement of a peripheral surface of the object being rotated, the method including the steps of: a video acquisition step of acquiring a video of the rotary base and a region around the rotary base; a display step of displaying an image based on the video on a display unit; a position recognition step of recognizing images of the rotary table, the rotary base, and the object displayed on the display unit and recognizing positions of the rotary table, the rotary base, and the object in a display space of the images; and a display control step of displaying a guide in a superimposing manner on the image displayed on the display unit on a basis of the positions of the rotary table, the rotary base, and the object recognized at the position recognition step.

According to such a configuration, when measurement is performed in the roundness measuring device, a video of the rotary table, the rotary base, and the object is acquired, and an image based on the acquired video is displayed on the display unit. At this time, positions of the rotary table, the rotary base, and the object displayed on the display unit are recognized, and the guide can be displayed in the superimposing manner on the display unit on the basis of the positions.

DESCRIPTION OF EMBODIMENTS

An embodiment of the invention will be described below with reference to the drawings. Note that in the following description, the same members will be denoted by the same reference signs, and description of the members that have already been described will be omitted appropriately.

Configuration of Roundness Measuring Device

Figure 1:
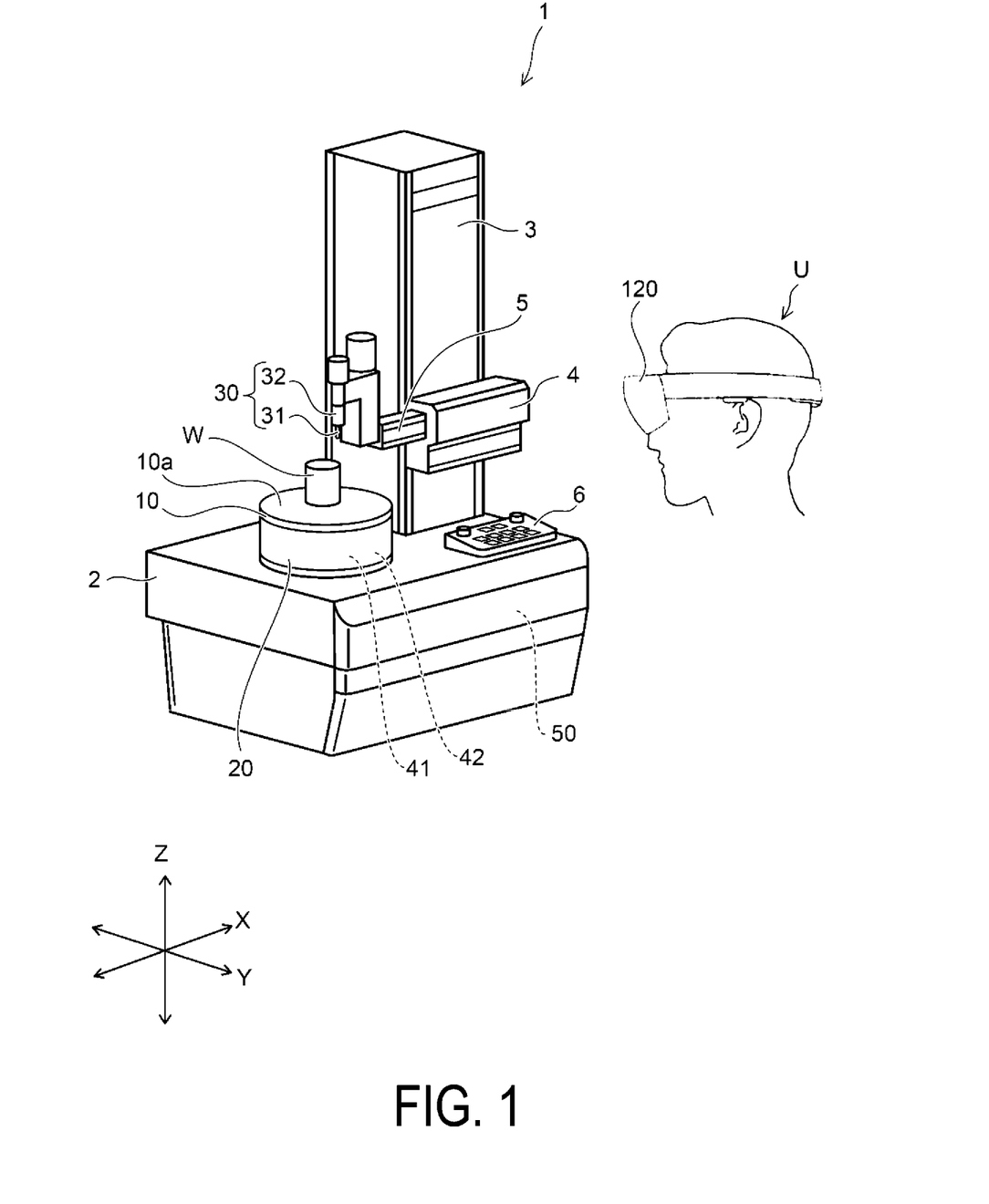
FIG. 1 is a perspective view illustrating an example of a roundness measuring device according to the present embodiment.

FIG. 1 is a perspective view illustrating an example of a roundness measuring device according to the present embodiment.

Figure 2:
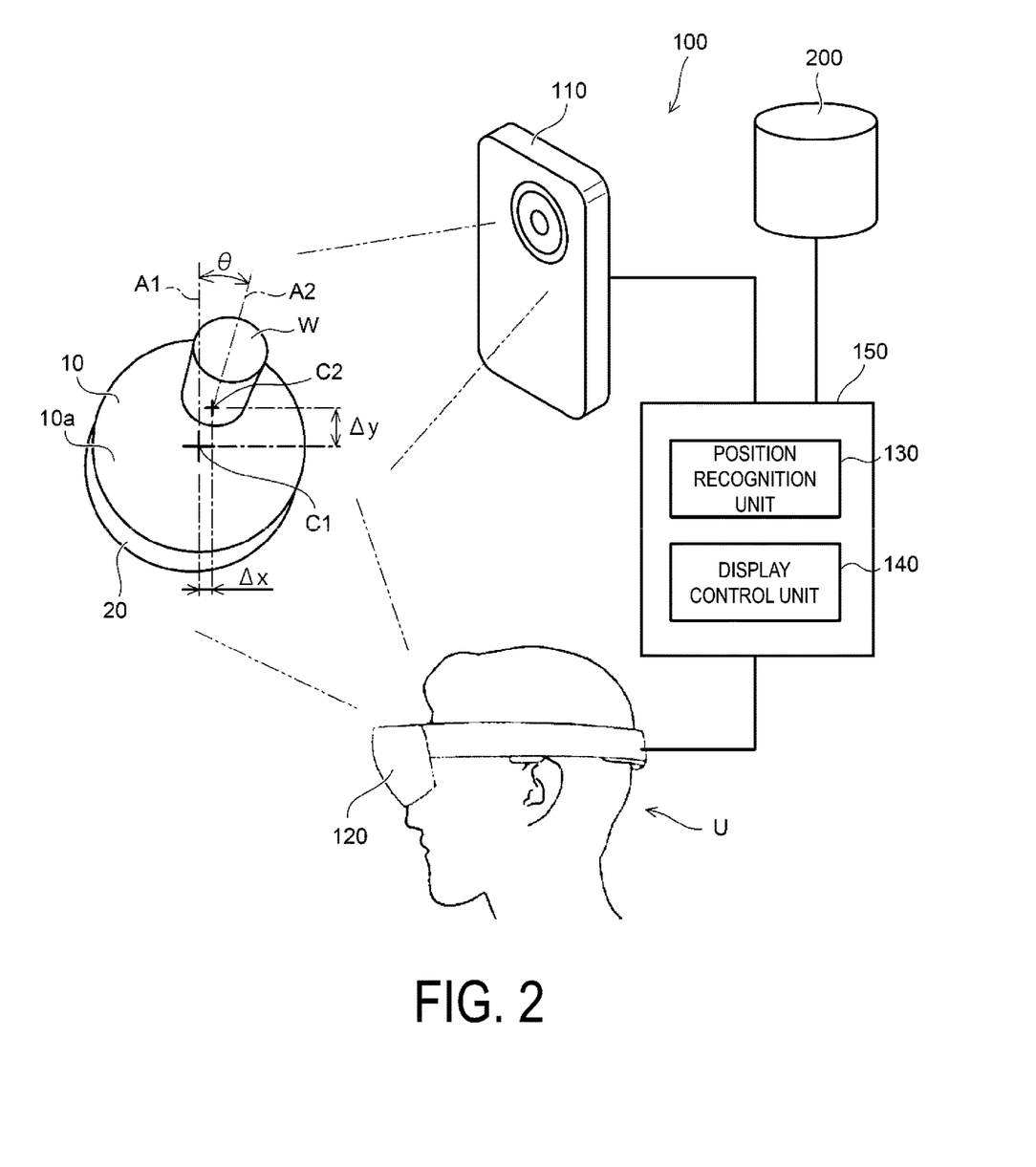
FIG. 2 is a configuration view illustrating an example of a measurement guide system according to the present embodiment.

FIG. 2 is a configuration view illustrating an example of a measurement guide system according to the present embodiment.

As illustrated in FIG. 1, a roundness measuring device 1 according to the present embodiment is a device configured to measure roundness and a peripheral surface shape of an object W by measuring the position of a peripheral surface of the object W. The roundness measuring device 1 includes a rotary table 10 including a placement surface 10a on which the object W is placed, a rotary base 20 configured to rotate the rotary table about a rotation axis, and a detector 30 configured to detect displacement of the peripheral surface of the object W being rotating. In addition, the roundness measuring device 1 includes an angle adjustment mechanism 41 configured to adjust an inclination angle of the rotary table 10 with respect to the rotation axis, and a position adjustment mechanism 42 configured to adjust the position of the rotary table 10 along a plane orthogonal to the rotation axis.

Note that in the present embodiment, for the convenience of description, a direction along the rotation axis of the rotary base 20 is set as a Z direction, and a direction orthogonal to the Z direction is set as an X direction, and a direction orthogonal to the Z direction and the X direction is set as a Y direction. In addition, the Z direction is also referred to as a vertical direction. The plane orthogonal to the rotation axis is an XY plane.

The roundness measuring device 1 includes a base 2, and the rotary base 20 is provided on the base 2. The rotary table 10 is placed on the rotary base 20 and rotates together with the rotary base 20. A column 3 is provided upright on a side of the rotary base 20 on the base 2. The detector 30 is attached on the column 3, and the detector 30 is vertically (in the Z direction) movable along the column 3.

The detector 30 includes a stylus 31 and a holder 32 configured to hold the stylus 31. The detector 30 is attached to a tip of a measurement arm 5 and is movable in the X direction with an advancing and retracting motion of the measurement arm 5. The angle of the detector 30 with respect to the measurement arm 5 and the angle of the stylus 31 with respect to the holder 32 can be changed.

The measurement arm 5 is attached to a slider 4. The slider 4 is vertically movable in the Z direction along the column 3, and the detector 30 attached to the tip of the measurement arm 5 is also vertically movable in the Z direction together with the movement of the slider 4.

An operation unit 6 is provided on the base 2 of the roundness measuring device 1. A user uses the operation unit 6 to move the position of the stylus 31 of the detector 30 and provide various measurement instructions. A computer (not illustrated) is connected to the roundness measuring device 1. A control unit 50 may be provided in a body of the roundness measuring device 1 or may be provided in the computer.

The angle adjustment mechanism 41 and the position adjustment mechanism 42 are incorporated in the rotary base 20. The angle adjustment mechanism 41 is a mechanism configured to adjust the inclination angle of the rotary table 10 placed on the rotary base 20. The rotation axis of the rotary base 20 is fixed, and the inclination angle of the placement surface 10a of the rotary table 10 with respect to the rotation axis can be adjusted by the angle adjustment mechanism 41. The adjustment range of the angle by the angle adjustment mechanism 41 is approximately ±1 degree.

The position adjustment mechanism 42 is a mechanism configured to adjust the position of the rotary table 10 along the XY plane. The position adjustment mechanism 42 includes an electric driving mechanism by a micrometer head and a motor not illustrated. The rotary base 20 is fixed, and the rotary table 10 placed on the rotary base 20 is moved by the position adjustment mechanism 42 along the XY plane. The adjustment range of the position in the XY direction by the position alignment mechanism 42 is approximately ±5 mm in each of the X direction and the Y direction.

In the roundness measuring device 1, in the state where the object W is placed on the placement surface 10a of the rotary table 10, leveling can be performed by adjusting the inclination angle of the rotary table 10 by the angle adjustment mechanism 41, and centering can be performed by adjusting the position of the rotary table 10 along the XY plane by the position adjustment mechanism 42. When the centering and the leveling are performed, a user U places the object W at the center of the rotary table 10 with reference to an image and a guide displayed on a display unit 120.

Measurement Operation

Next, a measurement operation by the roundness measuring device 1 will be described.

First, centering and leveling are performed. Details of the centering and the leveling will be described below. With the centering and the leveling, the positions and the angles of the rotation axis of the rotary base 20 and the center axis of the object W are aligned, and the rotation axis of the rotary base 20 and the center axis of the object W are set on the same straight line. Note that, in the centering and the leveling, it is only necessary that the values fall within a preset range (acceptable range).

Next, the stylus 31 is brought into contact with the peripheral surface of the object W to rotate the rotary table 10. The object W rotates about an axis as the rotary table 10 rotates, and the detector 30 detects displacement in the X direction of the stylus 31 coming into contact with the peripheral surface of the object W together with the rotation of the object W. On the basis of a relationship between the rotation angle of the rotary table 10 and the displacement in the X direction detected by the detector 30, roundness and a contour shape of the peripheral surface of the object W are detected.

Configuration of Measurement Guide System

The roundness measuring device 1 according to the present embodiment includes a measurement guide system 100 illustrated in FIG. 2. The measurement guide system 100 includes a video acquisition unit 110 including a camera, the display unit 120 configured to display an image, a position recognition unit 130, and a display control unit 140. The position recognition unit 130 and the display control unit 140 may be realized as a program executed by a processing device 150 such as a computer.

The video acquisition unit 110 acquires a video of a region around the rotary base 20. A video of the rotary table 10 placed on the rotary base 20 is also acquired. In addition, in a case where the object W is placed on the rotary table 10, the video acquisition unit 110 also acquires a video of the object W.

The display unit 120 displays an image based on the video of a region around the rotary base 20 acquired by the video acquisition unit 110. The display unit 120 may be of a goggles type as illustrated in FIG. 2, or may be of a display type of a flat surface or the like. When measurement of the object W is performed, a user places the object W on the placement surface 10a of the rotary table 10 with reference to the image displayed on the display unit 120 and performs centering and leveling.

The position recognition unit 130 recognizes images of the rotary table 10, the rotary base 20, and the object W displayed on the display unit 120 and performs processing for recognizing positions of the rotary table 10, the rotary base 20, and the object W in a display space of the images.

Specifically, on the basis of the video acquired by the video acquisition unit 110, the position of the rotary base 20 at a predetermined point on the display space is recognized, and the position of a rotation axis A1 of the rotary base 20 and the position of the rotation axis A1 on the placement surface 10a (position of a rotation center point C1) are determined. In addition, in a case where a video of the object W is acquired, the position of the object W at a predetermined point on the display space is recognized based on the video, and the position of a center axis A2 of the object W is determined. In addition, in a case where the object W is placed on the placement surface 10a, the position of the center axis A2 (position of an object center point C2) on the placement surface 10a is determined on the basis of the video of the object W.

The position recognition unit 130 may perform processing for recognizing the position on the basis of the video acquired by the video acquisition unit 110 as described above or may perform processing for recognizing the position on the basis of the data acquired by a three-dimensional sensor.

In addition, the position recognition unit 130 may recognize the position by using data acquired with a video and a three-dimensional sensor; and design data of the rotary table 10, the rotary base 20, and the object W. The design data is stored in a database 200, for example. The processing device 150 reads the design data stored in the database 200 and sends the design data to the position recognition unit 130. The position recognition unit 130 extracts, for example, an outer shape of the rotary base 20 from a video acquired and determines a relationship between an outer shape position and a size of the rotary base 20 on the display space on the basis of an outer shape size of the design data stored in the database 200. Then, on the basis of the relationship, the position of the rotation axis A1 on the display space is recognized. Similarly, positions of other members on the display space may also be recognized by utilizing design data.

The display control unit 140 performs control of displaying a guide in a superimposing manner on the image displayed on the display unit 140 on the basis of the positions of the rotary table 10, the rotary base 20, and the object W recognized by the position recognition unit 130. That is, on the basis of the positions of the rotary table 10, the rotary base 20, and the object W on the display space recognized by the position recognition unit 130, the display control unit 140 performs control of displaying on the display unit 120 various information obtained as a guide from the positions. A user performs the centering and the leveling with reference to images of the rotary table 10, the rotary base 20, and the object W displayed on the display unit 120, and the guide displayed in a superimposing manner on the images.

Measurement Guide Method

Next, a measurement guide method according to the present embodiment will be described.

Figure 3:
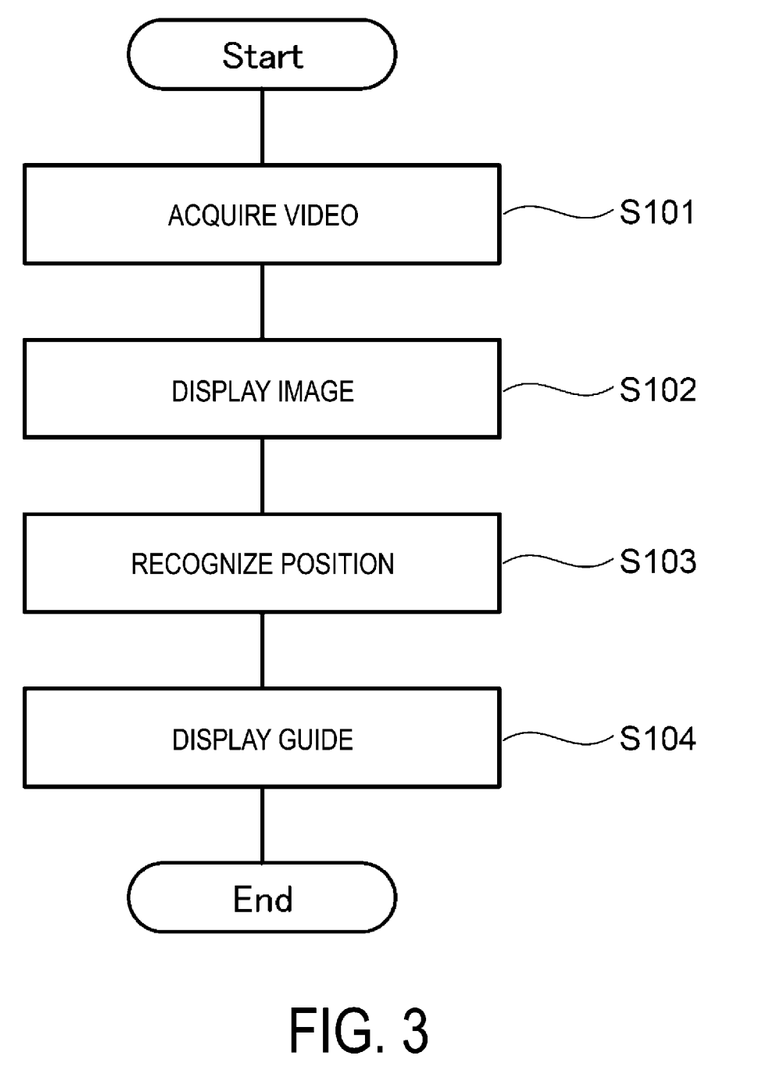
FIG. 3 is a flowchart illustrating an example of a measurement guide method.

FIG. 3 is a flowchart illustrating a measurement guide method.

First, as illustrated at step S101 in FIG. 3, a video is acquired (video acquisition step). Specifically, the video acquisition unit 110 acquires a video of the rotary base 20 and a region around the rotary base 20. At this time, a video of the rotary table 10 and the object W may be acquired.

Next, as illustrated at step S102, an image is displayed (display step). At step S102, an image based on the video acquired by the video acquisition unit 110 is displayed on the display unit 120. On the display unit 120, a user can refer to the image based on the video acquired by the video acquisition unit 110.

Next, as illustrated at step S103, position recognition is performed (position recognition step). At step S103, the images of the rotary table 10, the rotary base 20, and the object W displayed on the display unit 120 are recognized by the position recognition unit 130, and the positions of the rotary table 10, the rotary base 20, and the object W in the display space of the image are recognized.

Next, as illustrated at step S104, a guide is displayed (display control step). At step S104, an image that serves as a guide is displayed in a superimposing manner on the image displayed on the display unit 120 on the basis of the positions of the rotary table 10, the rotary base 20, and the object W recognized at the previous step, step S103. A user can perform an operation such as the centering and the leveling with reference to the images of the rotary table 10, the rotary base 20, and the object W displayed on the display unit 120; and the guide superimposed on the images.

Examples of Guide Display in Centering and Leveling

Next, examples of a guide display in a case where centering and leveling are performed will be described.

FIGS. 4 to 8 are views illustrating examples of a guide display in centering and leveling.

Each of FIGS. 4 to 8 illustrates an example of an image displayed on the display unit 120. Accordingly, the views of FIGS. 4 to 8 are reference images of the user U, and the user U is not illustrated in the views.

Figure 4:
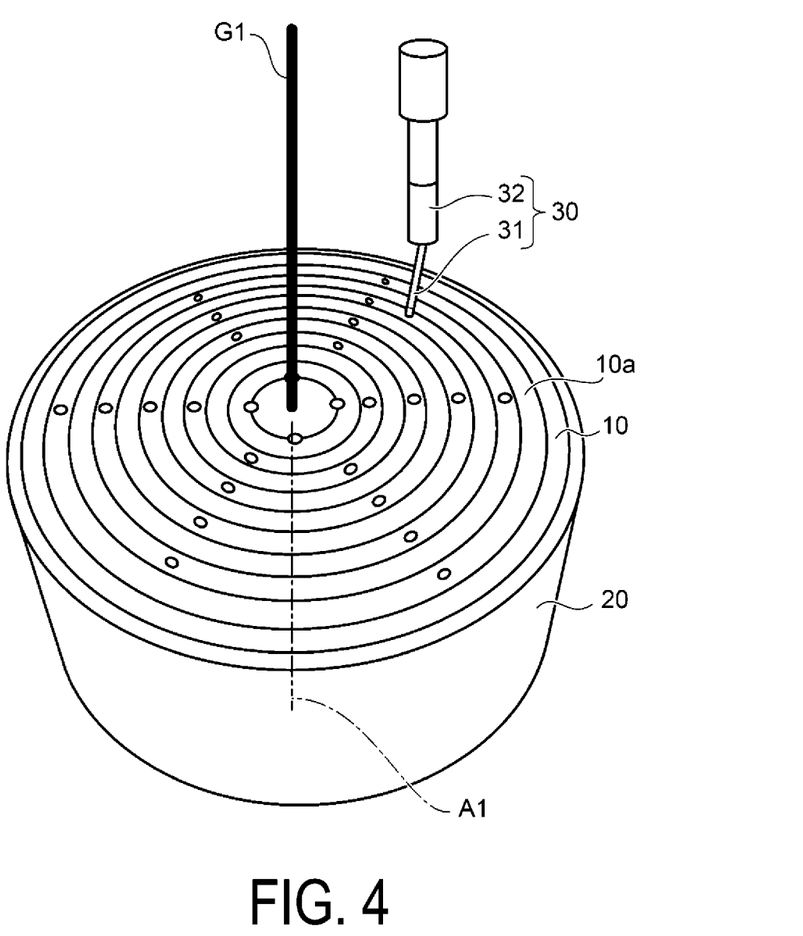
FIG. 4 is a view illustrating an example of a guide display in centering and leveling.

First, the video acquisition unit 110 acquires a video of the rotary base 20 and a region around the rotary base 20. With this image acquisition, images of the rotary base 20 and the rotary table 10 placed on the rotary base 20 are displayed as illustrated in FIG. 4. At this time, the position of the rotary base 20 on the display space and the position of the rotation axis A1 on the display space are recognized by the position recognition unit 130.

In response to the result of the position recognition of the rotary base 20 and the like by the position recognition unit 130, the display control unit 140 displays a rotation axis image G1 indicating the rotation axis A1 in a superimposing manner on the images of the rotary table 10 and the rotary base 20. The rotation axis image G1 is a virtual image. In the example illustrated in FIG. 4, the rotation axis image G1 is displayed on an extension of the rotation axis A1. The user U refers to the rotation axis image G1 virtual displayed in a superimposing manner on the images of the rotary table 10 and the rotary base 20 together with the images of the rotary table 10 and the rotary base 20, and thus the user U can visually determine the rotation axis A1 not actually visible.

Figure 5:
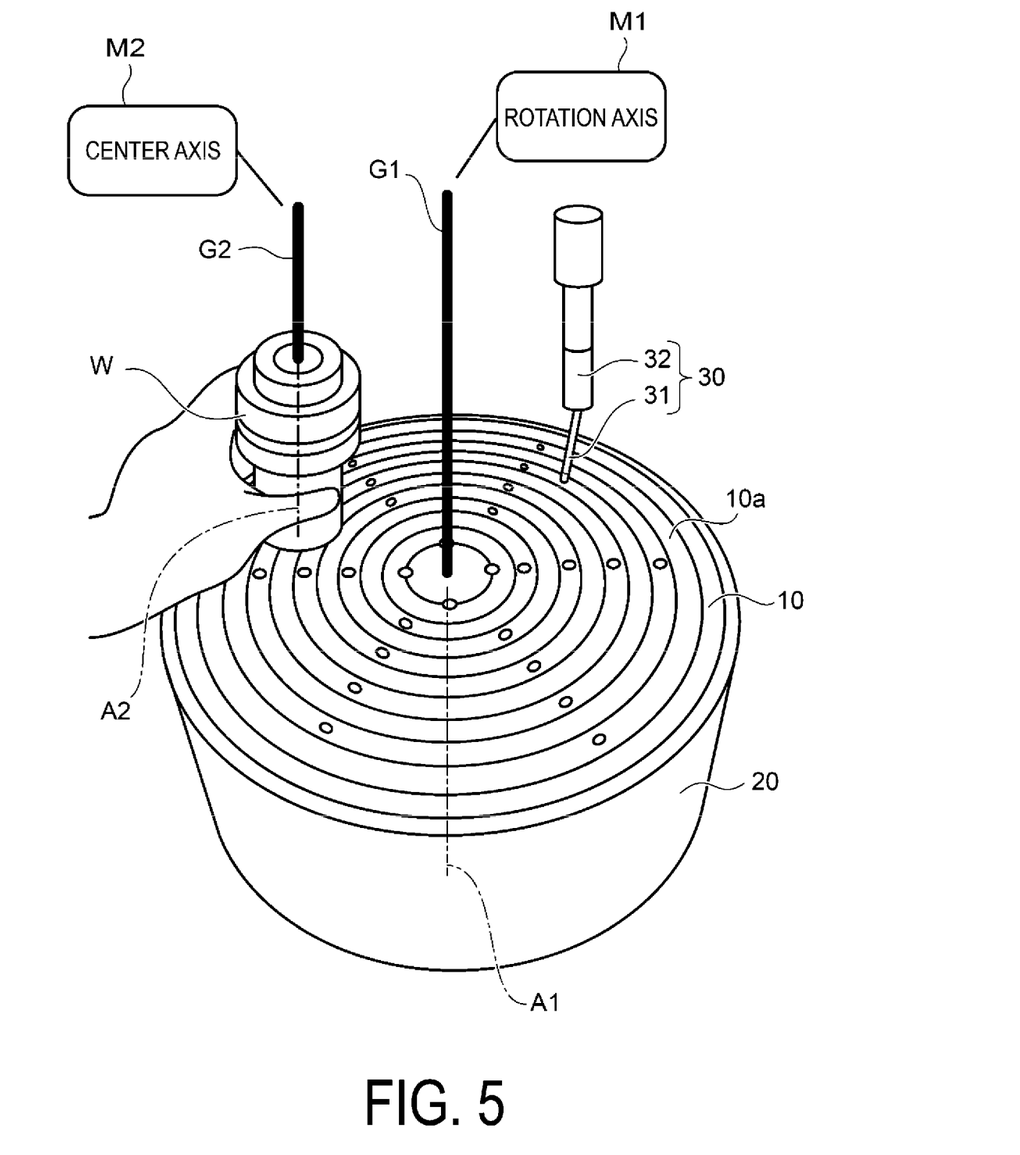
FIG. 5 is a view illustrating an example of a guide display in centering and leveling.

Next, as illustrated in FIG. 5, the object W is held by hand and moved up to the rotary table 10. When the object W falls within a viewing angle of the video acquisition unit 110, a video of the object W is acquired, and the position of the object W on the display space is recognized by the position recognition unit 130. In response to the result of the position recognition of the object W by the position recognition unit 130, the display control unit 140 displays a center axis image G2 indicating the center axis A2 in a superimposing manner on the image of the object W. The center axis image G2 is a virtual image.

In the example illustrated in FIG. 5, the center axis image G2 is displayed on an extension of the center axis A2. The user U refers to the center axis image G2 virtual displayed in a superimposing manner on the image of the object W together with the image of the object W, and thus the user U can visually determine the center axis A2 not actually visible.

In addition, the images may also be displayed with messages M1 and M2. For example, the message M1 of a character "rotation axis" indicating that the image is of a rotation axis is displayed together with the rotation axis image G1, or the message M2 of a character "center axis" indicating that the image is of a center axis is displayed together with the center axis image G2.

When the object W is moved by hand, the image of the object W in the display space in the display unit 120 also moves, and display positions of the center axis image G2 and the message M2 also move to follow the moving image.

Figure 6:
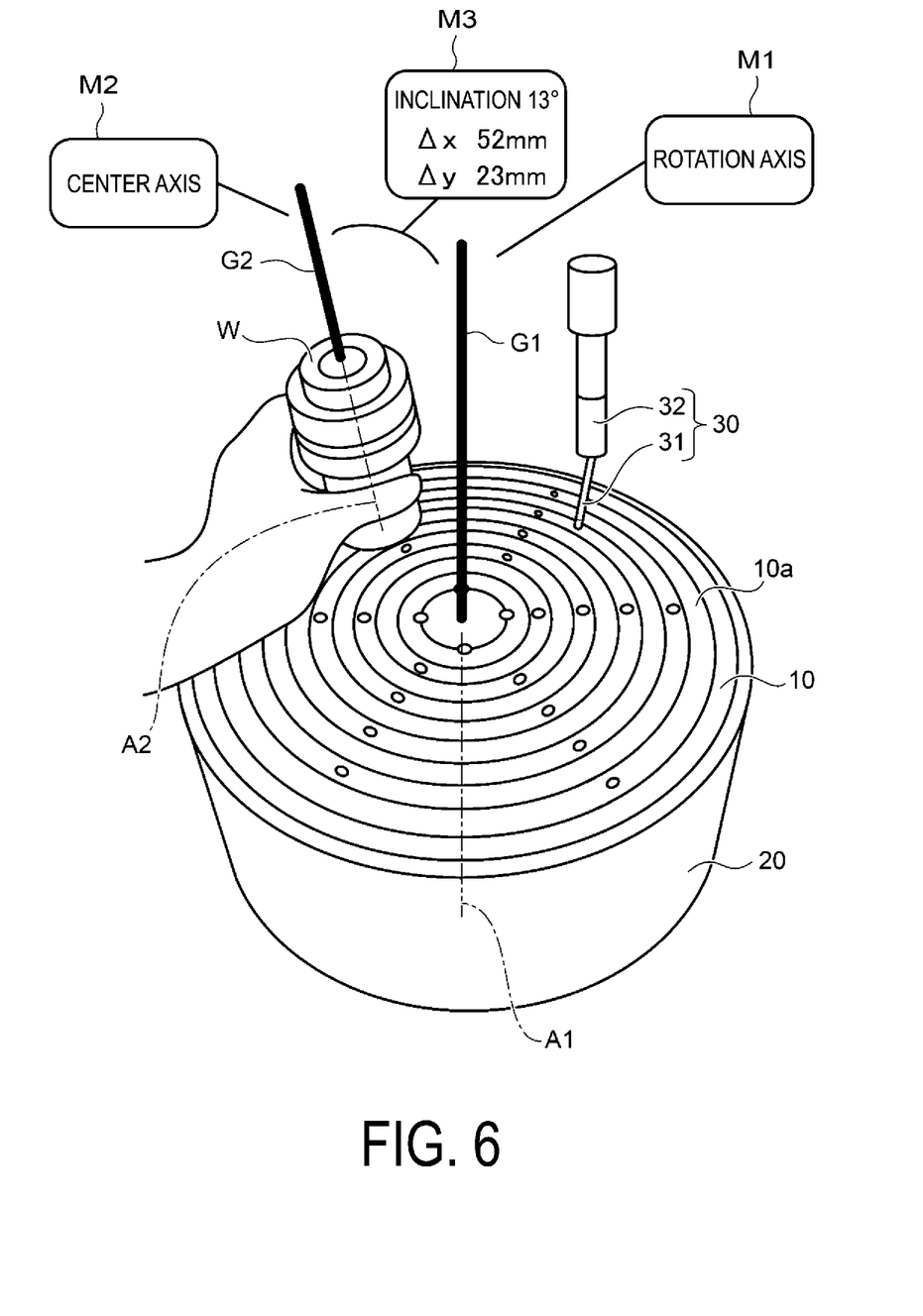
FIG. 6 is a view illustrating an example of a guide display in centering and leveling.

Next, as illustrated in FIG. 6, the object W is brought toward the rotation axis A1 by hand. At this time, since the rotation axis image G1 and the center axis image G2 are displayed in a superimposing manner together with the images of the object W and the rotary table 10 on the display unit 120, a user can align the object W with the center of the rotary table 10 with the rotation axis image G1 and the center axis image G2 serving as guides.

In addition, at this time, an image of a message M3 indicating a deviation angle (inclination) of the center axis A2 with respect to the rotation axis A1 and a positional deviation amount ($\Delta x$, $\Delta y$) of the center axis A2 with respect to the rotation axis A1 along the XY plane may be displayed in a superimposing manner on the image displayed on the display unit 120. With such a guide display, a user can determine the rotation axis A1 and the center axis A2 that are not actually visible and can quickly place the object W at the center of the rotary table 10 while referring to the information on the numerical deviation amount.

Figure 7:
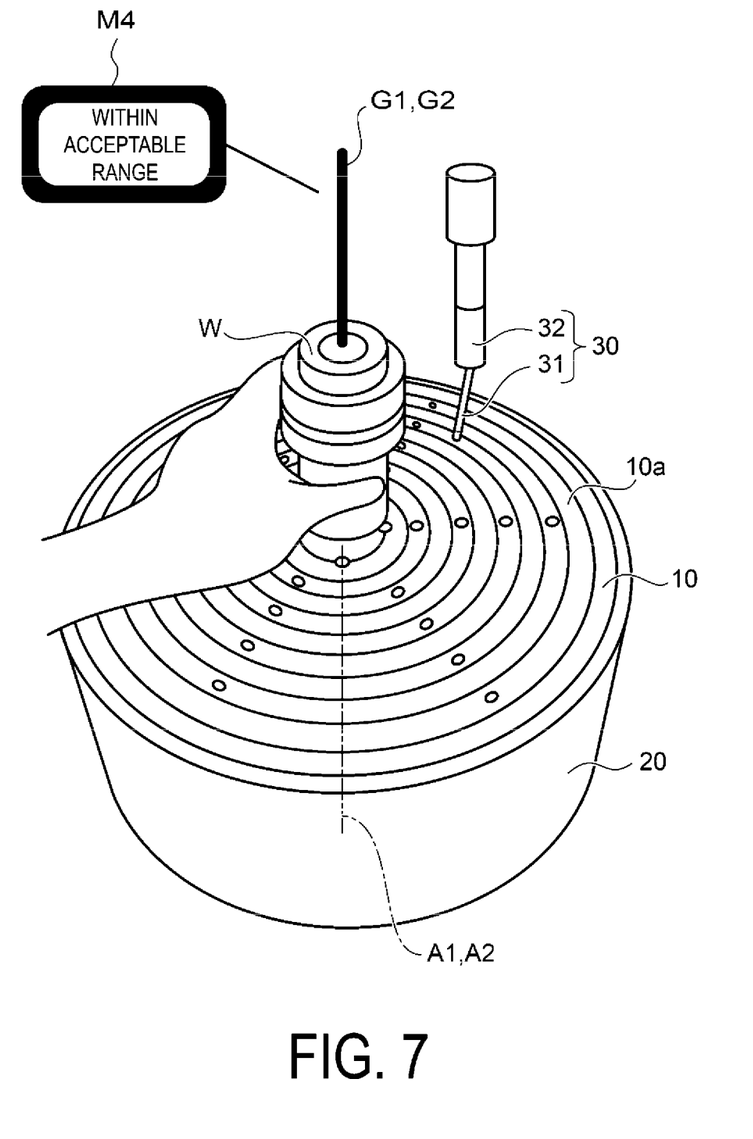
FIG. 7 is a view illustrating an example of a guide display in centering and leveling.

As illustrated in FIG. 7, when the deviation angle of the center axis A2 with respect to the rotation axis A1 and the positional deviation amount along the XY plane fall within a preset range (acceptable range) at the time when the object W is placed at the center of the rotary table 10, display of a state indicating that the deviation angle and the positional deviation amount are within the range may be provided. For example, an image of a message M4 indicating a message "within acceptable range" is displayed when the deviation angle and the positional deviation amount fall within an acceptable range. Thus, a user can easily determine whether the object W has been placed at the center of the rotary table 10 by a deviation amount falling within the acceptable range.

Figure 8:
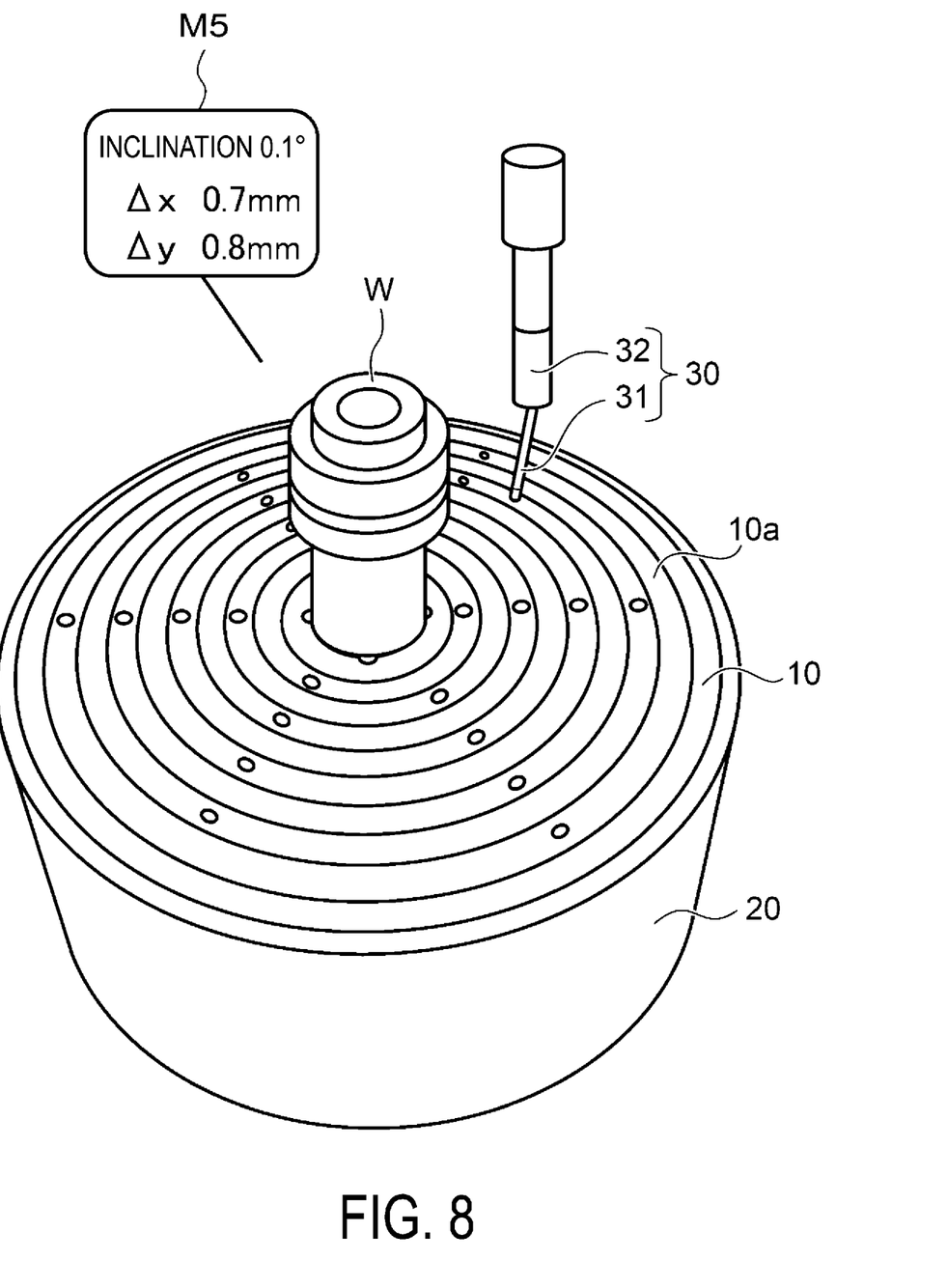
FIG. 8 is a view illustrating an example of a guide display in centering and leveling.

After the object W has been placed on the rotary table 10, an image of a message M5 indicating a deviation angle (inclination) of the center axis A2 with respect to the rotation axis A1 and a positional deviation amount ($\Delta x$, $\Delta y$) of the center axis A2 along the XY plane with respect to the rotation axis A1 in a state where the object W is placed may be displayed as illustrated in FIG. 8.

With reference to the display of the deviation amount, the user U operates the angle adjustment mechanism 41 and the position adjustment mechanism 42 of the rotary table 10 and performs centering and leveling. For example, in a case where a micrometer head (not illustrated) is provided, a rotation amount of the micrometer head may be adjusted with reference to the deviation amount displayed on the display unit 120. Since the object W is within the acceptable range, the adjustment can be achieved with a slight rotation amount.

In this manner, when the object W is placed on the rotary table 10, the object W can be set quickly and accurately at the center of the rotary table 10 with the guide display.

Here, when the rotation axis image G1 and the center axis image G2 are displayed in a superimposing manner on the actual image, the display control unit 140 displays CG images indicating the rotation axis image G1 and the center axis image G2 in a superimposing manner at corresponding positions of the actual images by a technique such as AR (Augmented Reality) and MR (Mixed Reality). At this time, the rotation axis image G1 and the center axis image G2 may be displayed in respective colors or forms differing from each other.

In addition, when the image of the message M3 indicating the deviation amount is displayed, the state display may be changed stepwise in accordance with the deviation amount. For example, a color code in which: "red" indicates that the deviation amount falls outside the acceptable range; "yellow" indicates that the deviation amount has become closer to the acceptable range; and "blue" indicates that the deviation amount falls within the acceptable range may be adopted.

When the centering and the leveling are performed in the roundness measurement, the user sets the object W at the rotary table 10 by hand, and then, with the above-described guide display, the user can easily and accurately set the object W at the center of the rotary table 10 (within the acceptable range). Accordingly, the number of times of repetition of preliminary measurement for the centering and the leveling is reduced, and a reduction in measurement time and improvement in measurement accuracy can be achieved.

Example of Automatic Centering and Leveling

Next, an example of automatic centering and leveling will be described.

Figure 9:
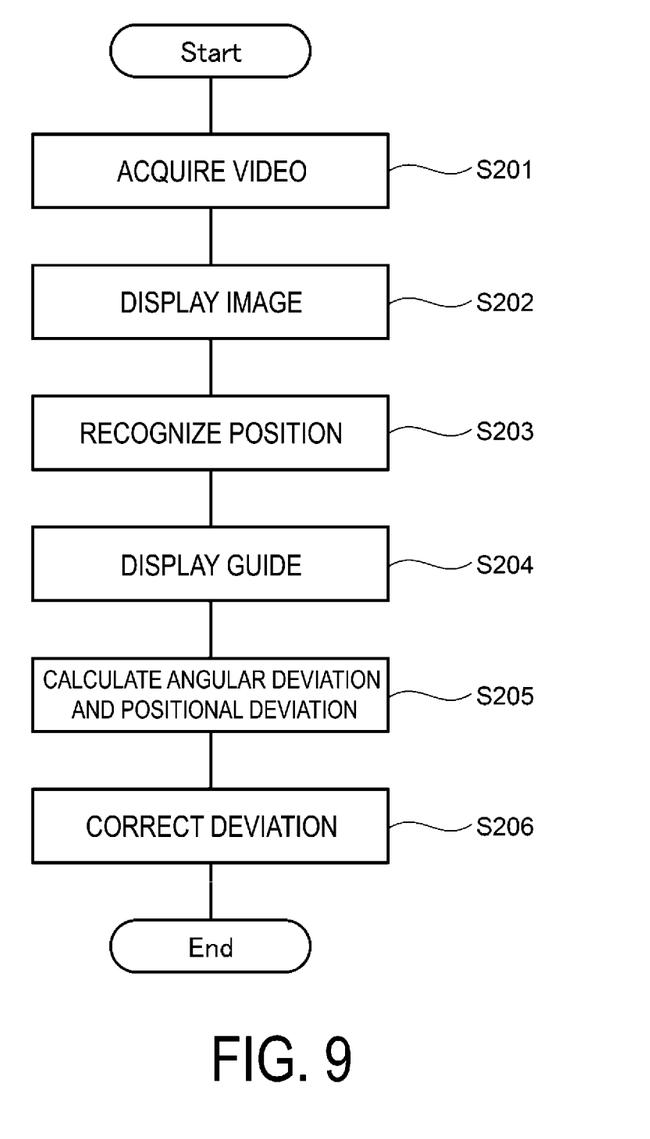
FIG. 9 is a flow chart illustrating an example of a method of automatic centering and leveling.

FIG. 9 is a flow chart illustrating an example of a method of automatic centering and leveling.

In FIG. 9, video acquisition at step S201, image display at step S202, position recognition at step S203, and guide display at step S204 are similar to steps S101, S102, S103, and S104 illustrated in FIG. 3 respectively.

Next, as illustrated at step S205, an angular deviation and a positional deviation are calculated. After the object W is placed at the center of the rotary table 10 with reference to the guide display, a deviation angle (inclination) of the center axis A2 with respect to the rotation axis A1 and a positional deviation amount of the center axis A2 with respect to the rotating axis A1 along the XY plane are calculated by the position recognition unit 130. This information may be displayed as the message M5 illustrated in FIG. 8.

Next, as illustrated at step S206, the calculated deviation is corrected. That is, information on a calculated deviation angle (inclination) and a calculated positional deviation amount (Δx, Δy) are sent to the angle adjustment mechanism 41 and the position adjustment mechanism 42. Thus, the angle of the rotary table 10 and the position along the XY plane are automatically adjusted to cancel out the respective deviation amounts. Thus, the user U can perform the automatic centering and leveling only by placing the object W on the rotary table 10.

As described above, according to the embodiment, it is possible to provide the roundness measuring device 1, the measurement guide system 100, and the measurement guide method enabling the object W to be easily and accurately aligned with the rotation axis A1 when the object W is placed on the rotary table 10.

Variations of Embodiments

Note that while present embodiment is described above, the invention is not limited to the above-described examples. For example, a sound may be output as a guide together with display of an image, or a moving image may be displayed as a guide. In addition, addition, omission and a design change of constituent elements made by those skilled in the art, and an appropriate combination of futures of embodiments are within the scope of the invention, as long as they are within the scope of the gist of the invention.

INDUSTRIAL APPLICABILITY

As described above, the invention can suitably be used for a device configured to measure surface roughness, in addition to a device configured to measure roundness and a peripheral surface shape of an object.

REFERENCE SIGNS LIST

1 Roundness measuring device
2 Base
3 Column
4 Slider
5 Measurement arm
6 Operation unit
10 Rotary table
10a Placement surface
20 Rotary base
30 Detector
31 Stylus
32 Holder
41 Angle adjustment mechanism
42 Position adjustment mechanism
50 Control unit
100 Measurement guide system
110 Video acquisition unit
120 Display unit
130 Position recognition unit
140 Display control unit
150 Processing device
200 Database
A1 Rotation axis
A2 Center axis
C1 Rotation center point
C2 Object center point
G1 Rotation axis image
G2 Center axis image
M1, M2, M3, M4, M5 Message
U User
W Object

The invention claimed is:

1. A roundness measuring device configured to measure a position of a peripheral surface of an object, the roundness measuring device comprising:
a rotary table including a placement surface on which the object is placed;
a rotary base configured to rotate the rotary table about a rotation axis;
a detector configured to detect displacement of the peripheral surface of the object being rotated;
an angle adjustment mechanism configured to adjust an inclination angle of the rotary table with respect to the rotation axis;
a position adjustment mechanism configured to adjust a position of the rotary table along a plane orthogonal to the rotation axis;
a camera configured to acquire a video of the rotary base and a region around the rotary base;
a display unit configured to display an image based on the video;
a position recognition unit configured to recognize images of the rotary table, the rotary base, and the object displayed on the display unit and configured to recognize positions of the rotary table, the rotary base, and the object in a display space of the images; and
a display control unit configured to perform control of displaying a guide in a superimposing manner on the image displayed on the display unit on a basis of the positions of the rotary table, the rotary base, and the object recognized by the position recognition unit.

2. The roundness measuring device according to claim 1, wherein
the position recognition unit recognizes a position of the rotation axis on a basis of the image of the rotary base; and
the display control unit performs control of displaying a rotation axis image indicating the rotation axis in a superimposing manner on the image of the rotary table displayed on the display unit on a basis of the position of the rotation axis recognized by the position recognition unit.

3. The roundness measuring device according to claim 1, wherein
the position recognition unit recognizes a position of a center axis of the object on a basis of the image of the object; and
the display control unit performs control of displaying a center axis image indicating the center axis in a superimposing manner on the image of the object displayed on the display unit on a basis of the position of the center axis recognized by the position recognition unit.

4. The roundness measuring device according to claim 3, wherein the display control unit performs control of displaying on the display unit a deviation angle of the center axis with respect to the rotation axis.

5. The roundness measuring device according to claim 4, wherein when the deviation angle falls within a preset range, the display control unit performs control of displaying on the display unit a state indicating that the deviation angle is within the preset range.

6. The roundness measuring device according to claim 4, wherein the display control unit performs control of sending to the angle adjustment mechanism the deviation angle obtained when the object is placed on the placement surface; and the angle adjustment mechanism adjusts the inclination angle of the rotary table to cancel out the deviation angle sent from the display control unit.

7. The roundness measuring device according to claim 3, wherein the display control unit performs control of displaying on the display unit a positional deviation amount of the center axis with respect to the rotation axis along the plane.

8. The roundness measuring device according to claim 7, wherein when the positional deviation amount falls within a preset range, the display control unit performs control of displaying on the display unit a state indicating that the positional deviation amount is within the preset range.

9. The roundness measuring device according to claim 7, wherein the display control unit performs control of sending to the position adjustment mechanism the positional deviation amount obtained when the object is placed on the placement surface; and the position adjustment mechanism adjusts the position of the rotary table along the plane to cancel out the positional deviation amount sent from the display control unit.

10. A measurement guide system configured to guide measurement in a roundness measuring device including a rotary table including a placement surface on which an object is placed, a rotary base configured to rotate the rotary table about a rotation axis, and a detector configured to detect displacement of a peripheral surface of the object being rotated, the measurement guide system comprising:

a camera configured to acquire a video of the rotary base and a region around the rotary base;

a display unit configured to display an image based on the video;

a position recognition unit configured to recognize images of the rotary table, the rotary base, and the object displayed on the display unit and configured to recognize positions of the rotary table, the rotary base, and the object in a display space of the images; and a display control unit configured to perform control of displaying a guide in a superimposing manner on the image displayed on the display unit on a basis of the positions of the rotary table, the rotary base, and the object recognized by the position recognition unit.

11. A measurement guide method for guiding measurement in a roundness measuring device including a rotary table including a placement surface on which an object is placed, a rotary base configured to rotate the rotary table about a rotation axis, and a detector configured to detect displacement of a peripheral surface of the object being rotated, the method comprising the steps of:

a video acquisition step of acquiring a video of the rotary base and a region around the rotary base by a camera;

a display step of displaying an image based on the video on a display unit;

a position recognition step of recognizing images of the rotary table, the rotary base, and the object displayed on the display unit and recognizing positions of the rotary table, the rotary base, and the object in a display space of the images; and a display control step of displaying a guide in a superimposing manner on the image displayed on the display unit on a basis of the positions of the rotary table, the rotary base, and the object recognized at the position recognition step.

* * * * *